United States Patent
Sakui et al.

(10) Patent No.: US 10,102,095 B2
(45) Date of Patent: Oct. 16, 2018

(54) PERIPHERAL MANAGEMENT SYSTEM, MANAGEMENT DEVICE, AND MANAGEMENT METHOD

(71) Applicant: PFU Limited, Kahoku-shi, Ishikawa (JP)

(72) Inventors: Masahito Sakui, Kahoku (JP); Yoshinobu Araya, Kohoku (JP)

(73) Assignee: PFU LIMITED, Ishikawa (JP)

( * ) Notice: Subject to any disclaimer, the term of this patent is extended or adjusted under 35 U.S.C. 154(b) by 200 days.

(21) Appl. No.: 15/058,310

(22) Filed: Mar. 2, 2016

(65) Prior Publication Data
US 2017/0139800 A1    May 18, 2017

(30) Foreign Application Priority Data
Nov. 12, 2015  (JP) ................................. 2015-222114

(51) Int. Cl.
*G06F 11/30* (2006.01)
*G06F 11/22* (2006.01)
*G06F 11/32* (2006.01)

(52) U.S. Cl.
CPC ...... *G06F 11/3051* (2013.01); *G06F 11/2289* (2013.01); *G06F 11/327* (2013.01)

(58) Field of Classification Search
CPC . G06F 11/327; G06F 11/2289; G06F 11/3051
See application file for complete search history.

(56) References Cited

U.S. PATENT DOCUMENTS

| 6,721,898 B1* | 4/2004 | Hasha ...................... G06F 8/38 |
| | | 712/E9.084 |
| 2004/0210897 A1* | 10/2004 | Brockway ............. G06F 9/4411 |
| | | 717/174 |

(Continued)

FOREIGN PATENT DOCUMENTS

| JP | 11-353145 A | 12/1999 |
| JP | 2005-242564 A | 9/2005 |

(Continued)

OTHER PUBLICATIONS

Office Action dated Sep. 2, 2016, corresponding to Japanese Patent Application JP 2015-222114, with English language translation.

*Primary Examiner* — Nimesh G Patel
(74) *Attorney, Agent, or Firm* — McDermott, Will & Emery LLP

(57) ABSTRACT

There is provided a peripheral management system including a client terminal which a peripheral can be connected to and a management device which manages the peripheral, wherein: the client terminal comprises: a detection unit configured to detect an operating state of the connected peripheral; and a notification unit configured to notify the management device of the operating state detected by the detection unit at a predetermined communication interval; the management device comprises a storage unit configured to store the operating state of the peripheral notified by the notification unit; and the notification unit of the client terminal communicates with the management device at a longer communication interval than that when the peripheral to be managed is connected to the client terminal, when the peripheral to be managed is not connected to the client terminal.

7 Claims, 15 Drawing Sheets

(56) References Cited

U.S. PATENT DOCUMENTS

| | | | |
|---|---|---|---|
| 2006/0129669 A1 | 6/2006 | Kojima | |
| 2009/0254900 A1* | 10/2009 | Nakamura | G06F 9/445 717/176 |
| 2009/0305732 A1* | 12/2009 | Marcellino | H04L 51/24 455/466 |
| 2010/0287297 A1* | 11/2010 | Lefebvre | H04N 21/23805 709/231 |
| 2013/0238775 A1* | 9/2013 | Taguchi | G06F 9/45558 709/223 |

FOREIGN PATENT DOCUMENTS

| | | |
|---|---|---|
| JP | 2005-327097 A | 11/2005 |
| JP | 2006-173681 A | 6/2006 |
| JP | 2008-015799 A | 1/2008 |
| JP | 2013-012247 A | 1/2013 |
| JP | 2014-238738 A | 12/2014 |

\* cited by examiner

Client terminal 3

Terminal management table 900

| Terminal ID | Terminal name | Connected peripheral ID | Management state |
|---|---|---|---|
| T001 | PC-A | H001 | To be managed |
| T002 | PC-B | – | Not to be managed |
| T003 | PC-C | – | Not to be managed |

<u>Steady state</u>

Terminal management table 900

| Terminal ID | Terminal name | Connected peripheral ID | Management state |
|---|---|---|---|
| T001 | PC-A | H001 | To be managed |
| T002 | PC-B | – ⇒H002 | Not to be managed ⇒To be managed |
| T003 | PC-C | – | Not to be managed |

Connections with peripherals

Movement of peripherals

Terminal management table 900

| Terminal ID | Terminal name | Connected peripheral ID | Management state |
|---|---|---|---|
| T001 | PC-A | H001 | Not to be managed |
| T002 | PC-B | H002 | To be managed |
| T003 | PC-C | H001 | To be managed |

<u>After movement of the peripherals</u>

FIG. 10

| Terminal names | Types of connected peripherals | Model names of connected peripherals | Serial Nos. of connected peripherals | Operating states of connected peripherals | ... |
|---|---|---|---|---|---|
| PC-A | Scanner | Scan100 | S001 | ON | ... |
| PC-B | Printer | Print100 | S002 | ON | ... |
| PC-C | — | — | — | — | ... |
| PC-D | — | — | — | — | ... |
| PC-E | Scanner | Scan500 | S003 | OFF | ... |
| PC-F | — | — | — | — | ... |
| PC-G | Multifunction machine | Comp300 | S004 | ON | ... |
| PC-H | — | — | — | — | ... |

Page : 1 2 3 4 5 6 7 8 9 10

FIG. 11

| Terminal names | Types of connected peripherals | Model names of connected peripherals | Serial Nos. of connected peripherals | Operating states of connected peripherals | ... |
|---|---|---|---|---|---|
| PC-A | Scanner | Scan100 | S001 | ON | ... |
| PC-B | Printer | Print100 | S002 | ON | ... |
| PC-E | Scanner | Scan500 | S003 | OFF | ... |
| PC-G | Multifunction machine | Comp300 | S004 | ON | ... |
| PC-I | Printer | Print50 | S005 | ON | ... |
| PC-J | Printer | Print1000 | S006 | ON | ... |
| PC-O | Multifunction machine | Comp100 | S007 | OFF | ... |
| PC-Q | Scanner | Scan700 | S008 | ON | ... |

List display

Page : 1

FIG. 12

Terminal management table 900

| Terminal ID | Terminal name | Connected peripheral ID | Management state |
|---|---|---|---|
| T001 | PC-A | H003 | To be managed |
| T002 | PC-B | – | Not to be managed |
| T003 | PC-C | H001 | To be managed |
| T004 | PC-D | H004 | To be managed |
| T005 | PC-E | H001 | Not to be managed |
| ... | ... | ... | ... |

Peripheral information management table 910

| Peripheral ID | Type of peripheral | Model name of peripheral | Serial No. of peripheral | operating state | ... |
|---|---|---|---|---|---|
| H001 | Scanner | Scan100 | Scan100 | ON | ... |
| H002 | Printer | Print500 | Print500 | OFF | ... |
| H003 | Scanner | Scan300 | Scan300 | ON | ... |
| H004 | Printer | Print750 | Print750 | ON | ... |
| ... | ... | ... | ... | ... | ... |

Peripheral movement processing (S10)

Management-target exclusion process (S20)

Notification interval setting process (S30)

PERIPHERAL MANAGEMENT SYSTEM, MANAGEMENT DEVICE, AND MANAGEMENT METHOD

CROSS-REFERENCE TO RELATED APPLICATIONS

This application is based on and claims priority under 35 USC 119 from Japanese Patent Application No. 2015-222114 filed Nov. 12, 2015.

FIELD

The present invention relates to a peripheral management system, a management device, and a management method.

BACKGROUND

For example, JP 11-353145 A discloses a local monitoring device that transmits status information about an operating state of an apparatus to be monitored, to an integrated monitoring device via a computer network, the local monitoring device comprising: a local information acquisition means that acquires the status information from the apparatus via a computer network of type 1; a local information storage means that stores status information acquired by the local information acquisition means; and a local information transmission means that transmits at least some pieces of status information, stored in this local information storage means, to the integrated monitoring device via a computer network of type 2 that connects the computer network of type 1 to the integrated monitoring device.

Additionally, JP 2005-327097 A discloses a remote management device that remotely manages an office machine, the management device comprising: a providing means that provides a selection screen for selecting an item of data to be collected from an office machine to be managed; a storage means for storing, as an item of data to be collected from the office machine, the item of data selected on the selection screen provided by the providing means; and a collecting means for collecting, from this office machine, data selected on the basis of an item of data to be collected from the office machine stored in the storage means.

Additionally, JP 2014-238738 discloses an apparatus management system comprising: an electronic apparatus; an agent unit that acquires apparatus state information about the state of the electronic apparatus from the electronic apparatus; a remote maintenance server that transmits an instruction to acquire the apparatus state information, to the agent unit, and that receives the apparatus state information from the agent unit; a service terminal device that causes the remote maintenance server to output an instruction to acquire the apparatus state information; and a client database including client management information about a client of the electronic apparatus; wherein the remote maintenance server: (a) acquires operating schedule information for the electronic apparatus; and (b), if timing of transmission of an instruction to acquire the apparatus state information specified by the service terminal device is not within an operating time based on operating schedule information, specifies, on the basis of the client management information in the client database, a recommended timing of transmission of the instruction to acquire the apparatus status information, and informs the service terminal device of the specified recommended timing of transmission.

SUMMARY

According to an aspect of the invention, there is provided a peripheral management system including a client terminal which a peripheral can be connected to and a management device which manages the peripheral, wherein: the client terminal comprises: a detection unit configured to detect an operating state of the connected peripheral; and a notification unit configured to notify the management device of the operating state detected by the detection unit at a predetermined communication interval; the management device comprises a storage unit configured to store the operating state of the peripheral notified by the notification unit; and the notification unit of the client terminal communicates with the management device at a longer communication interval than that when the peripheral to be managed is connected to the client terminal, when the peripheral to be managed is not connected to the client terminal.

According to another aspect of the invention, there is provided a management device which communicates with a client terminal which a peripheral can be connected to and manages the peripheral, having: a notification receiving unit configured to receive periodic notification which the client terminal notifies periodically of; a storage unit configured to store existence or non-existence of the peripheral and an operating state in condition where they are correlated with identification information of the client terminal based on information received by the notification receiving unit; and an instruction unit configured to instruct an instruction of a communication interval corresponding to a period notification to the client terminal in response to the existence or non-existence of the peripheral or the operating state stored by the storage unit, wherein the instruction unit instructs to the client terminal a longer communication interval than that when the peripheral to be managed is connected to the client terminal, when the peripheral to be managed is not connected to the client terminal.

According to another aspect of the invention, there is provided a management method of managing a peripheral via a client terminal which the peripheral can be connected to, comprising: a detection step of the client terminal detecting an operating state of the connected peripheral; a notification step of the client terminal notifying a management device of the operating state detected in the detection step at a predetermined communication interval; and a storage step of the management device storing the operating state of the peripheral notified by the client terminal, wherein in the notification step, the client terminal communicates with the management device at a longer communication interval than that when the peripheral to be managed is connected to the client terminal, when the peripheral to be managed is not connected to the client terminal.

BRIEF DESCRIPTION OF DRAWINGS

Exemplary embodiments of the present invention will be described in detail based on the following figures.

FIG. 10 is a diagram of an example of a display screen of a management server 7 in conventional technique;

FIG. 11 is a diagram of an example of a display screen of the management server 7 in the present invention;

FIG. 12 shows examples of the terminal management table 900 and the peripheral management table 910;

DESCRIPTION OF EMBODIMENTS

Figure 1:
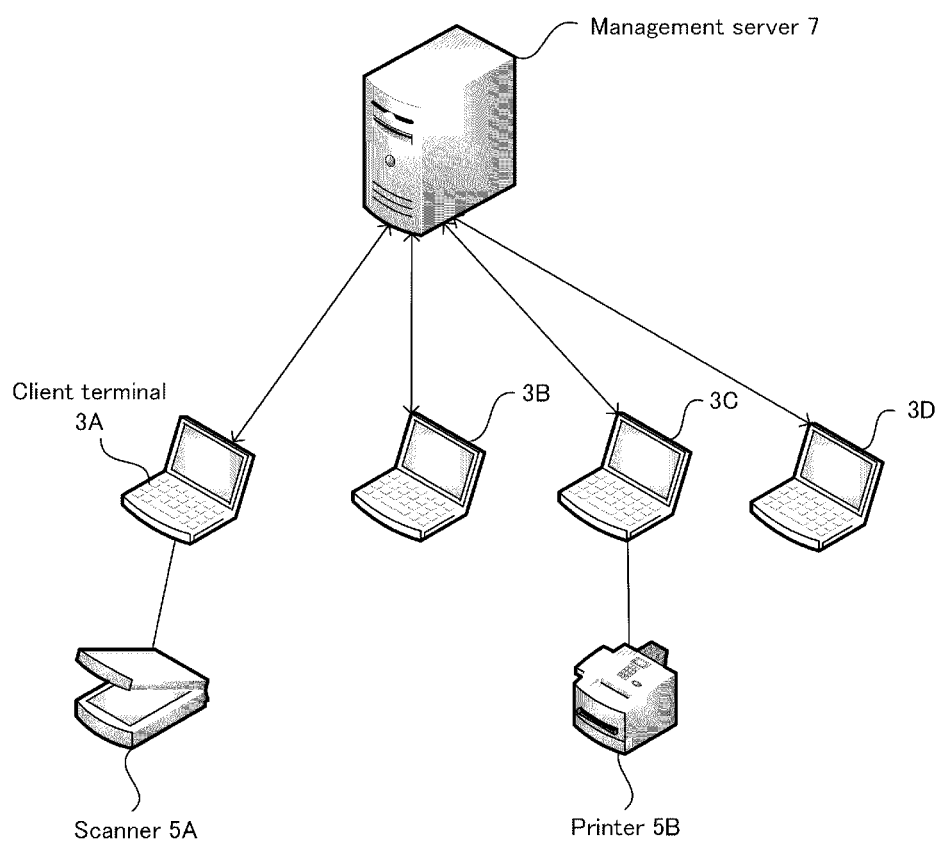
FIG. 1 is a diagram of an example of the hardware configuration of a peripheral management system 1.

Referring to the drawings, an embodiment of the present invention will be described below.

FIG. 1 is a diagram of an example of the hardware configuration of a peripheral management system 1.

As shown in FIG. 1 as an example, the peripheral management system 1 comprises client terminals 3A to 3D, peripherals 5A, 5B, and a management server 7.

The client terminals 3 are, for example, computer terminals and connected to peripherals 5 by wire or radio. The client terminals 3 are connected to the management server 7 via a network.

For example, a firewall or the like is installed between the management server 7 and the client terminals 3, and only some communications, such as http (Hyper Text Transfer Protocol) and https (Hyper Text Transfer Protocol Secure), from the client terminals 3 to the management server 7 are permitted.

Using http communication, the client terminals 3 according to the present embodiment periodically transmit heartbeats to the management server 7. Thereby, the management server 7 monitors operating states of the peripherals 5 over the firewall. Here, a heartbeat is an example of notification data according to the present invention, and is a signal for the client terminals 3 to inform the management server 7 of operating states of the peripherals 5.

The peripherals 5 are devices connected to the client terminals 3 by wire or radio, examples of which are a scanner 5A, printer 5B, or the like.

More specifically, the peripherals 5 are connected to the client terminals 3 via SCSI (Small Computer System Interface), USB (Universal Serial Bus), IEEE1394, or the like.

The management server 7 is an example of a management device according to the present invention. The management server 7 is a computer terminal and has a server function. The management server 7 is connected to the client terminals 3 via a network such as a LAN (Local Area Network) or WAN (Wide Area Network) and manages the peripherals 5.

In the present embodiment, the management server 7 manages client terminals 3 to which the peripherals 5 are connected, thereby managing the peripherals 5.

Figure 2:
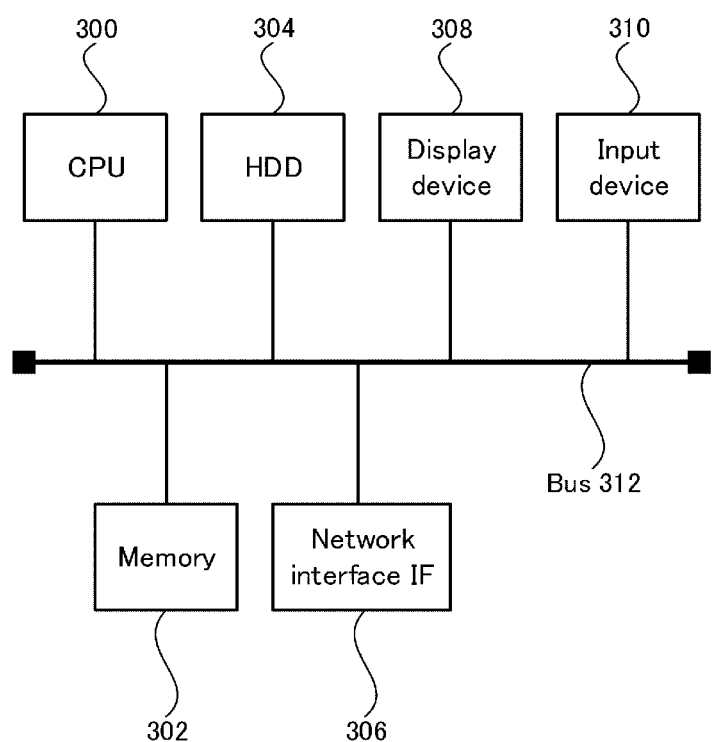
FIG. 2 is a diagram of an example of the hardware configuration of each client terminal 3.

FIG. 2 is a diagram of an example of the hardware configuration of each client terminal 3.

As shown in FIG. 2 as an example, the client terminal 3 has a CPU 300, memory 302, Hard Disk Drive 304 (HDD 304), network interface 306 (network IF 306), display device 308, and input device 310. These configurations are connected one to another via a bus 312.

The CPU 300 is, for example, a Central Processing Unit.

The memory 302 is, for example, a volatile memory and functions as a main storage device.

The HDD 304 is, for example, a hard disk drive device, and stores a computer program and other data files, as a nonvolatile recording device.

The network IF 306 is an interface for communication by wire or radio, and achieves communication with a client terminal 3 via the internet.

The display device 308 is, for example, a liquid crystal display.

The input device 310 is, for example, a keyboard and mouse.

Figure 3:
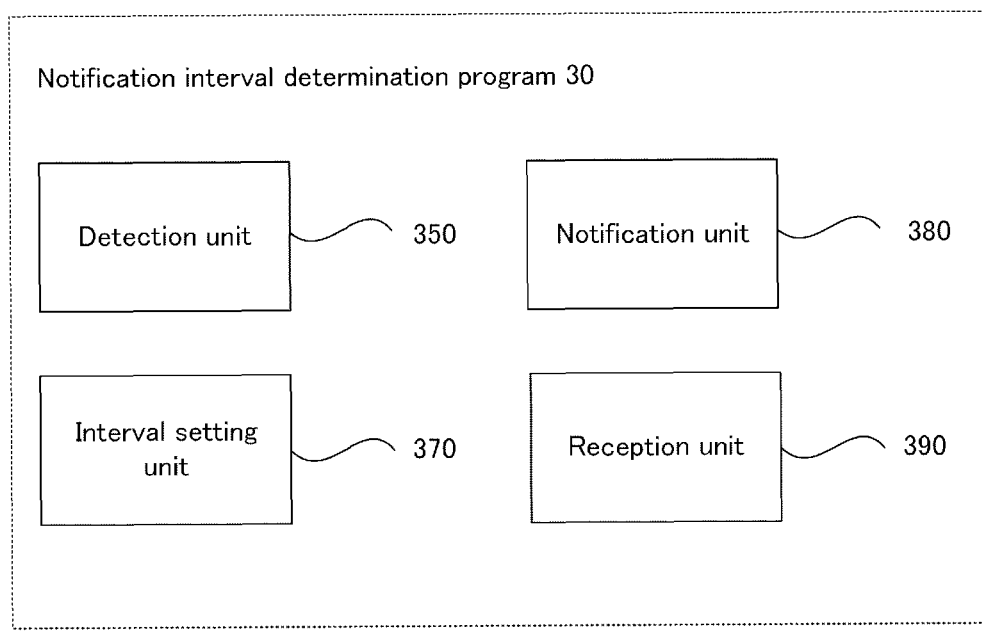
FIG. 3 is a diagram of an example of the functional configuration of each client terminal 3.

FIG. 3 is a diagram of an example of the functional configuration of each client terminal 3.

As shown in FIG. 3 as an example, a notification interval determination program 30 is installed in the client terminal 3 according to the present embodiment.

The notification interval determination program 30 has a detection unit 350, interval setting unit 370, notification unit 380, and reception unit 390.

Part or all of the notification interval determination program 30 may be achieved by hardware such as an ASIC (Application Specific Integrated Circuit), or may be achieved by borrowing part of the function of an OS (Operating System).

In the notification interval determination program 30, the detection unit 350 detects an operating state of a peripheral 5 connected thereto.

For example, the detection unit 350 detects a power on/off state of the peripheral 5 and an operating state such as information about peripherals (e.g., the apparatus type, model name, and serial number of the peripheral 5, and an exhausted state of the apparatus).

More specifically, the detection unit 350 detects, for example, a power on/off state of the peripheral 5 when the peripheral 5 has been connected thereto, and an on-state of the power when another peripheral 5 is connected thereto.

The interval setting unit 370 sets a communication interval used for notification by the notification unit 380.

For example, when a peripheral 5 is not connected to a client terminal 3, the interval setting unit 370 sets a communication interval longer than that when a peripheral 5 to be managed is connected to a client terminal 3.

If an instruction to stop heartbeat-notification is given due to information given in reply by the management server 7 as a response to the heartbeat-notification when the peripheral 5 is not connected to a client terminal 3, the interval setting unit 370 according to the present embodiment sets a communication interval for heartbeat-notification to infinity.

Additionally, the interval setting unit 370 sets a communication interval to finite time in accordance with instruction of periodic notification from the management server 7.

The interval setting unit 370 according to the present embodiment sets the period of heartbeat-notification to a communication interval of finite time if an instruction of periodic notification is given due to information given in reply by the management server 7 as a response to heartbeat-notification.

At a predetermined communication interval, the notification unit 380 notifies the management server 7 of an operating state detected by the detection unit 350. The notification unit 380 heartbeat-notifies the management server 7 of a power-on state detected by the detection unit 350 (heartbeat-notification due to power-on detection). The heartbeat-notification due to power-on detection may include information about peripherals (hereinafter, referred to as peripheral information).

Additionally, in a steady state in which a power on/off state of the peripheral 5 is not detected by the detection unit 350, if a client terminal 3 connected to a peripheral 5 is to be managed, the notification unit 380 according to the present embodiment heartbeat-notifies peripheral information (heartbeat-notification due to periodic notification). The heartbeat-notification due to periodic notification may include information about the power on/off state of the peripheral 5.

Additionally, when a peripheral 5 to be managed is not connected to a client terminal 3, the notification unit 380 communicates with the management server 7 at a communication interval longer than that when a peripheral 5 to be managed is connected to a client terminal 3.

When a peripheral 5 to be managed is not connected to a client terminal 3, the notification unit 380 according to the present embodiment is instructed, by the management server 7 as a response to heartbeat-notification in the periodic notification, to stop heartbeat-notification in periodic notification, and stops the heartbeat-notification in the periodic notification.

The reception unit 390 receives information given in reply by the management server 7, regarding operating-state notification.

The reception unit 390 according to the present embodiment receives information given in reply by the management server 7, regarding heartbeat-notification.

Figure 4:
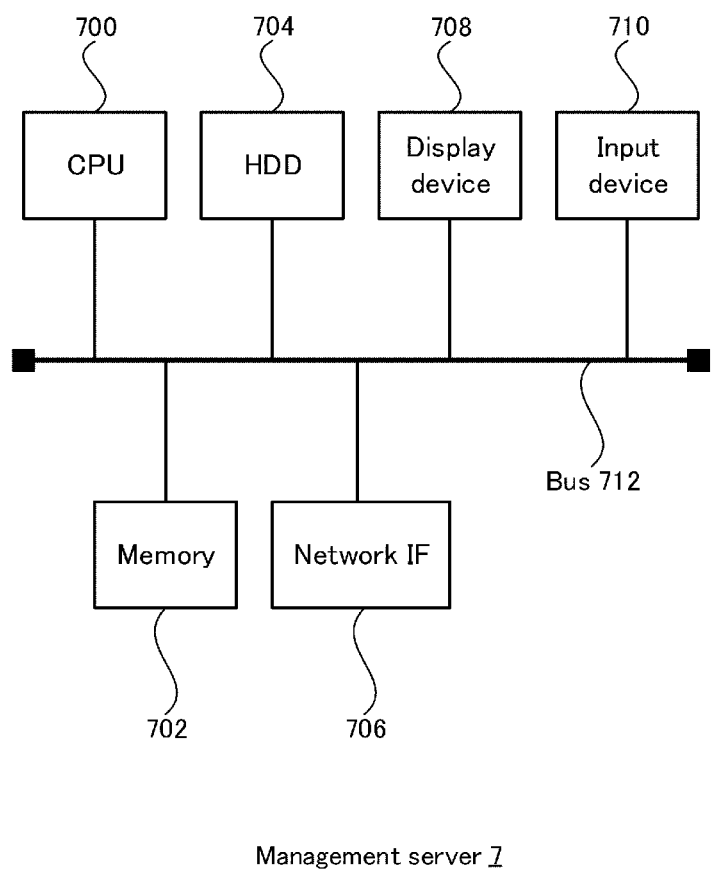
FIG. 4 is a diagram of an example of the hardware configuration of the management server 7.

FIG. 4 is a diagram of an example of the hardware configuration of the management server 7.

As shown in FIG. 4 as an example, image management server 7 has a CPU 700, memory 702, Hard Disk Drive 704 (HDD 704), network interface 706 (network IF 706), display device 708, and input device 710. These configurations are connected one another via a bus 712.

The CPU 700 is, for example, a Central Processing Unit.

The memory 702 is, for example, a volatile memory and functions as a main storage device.

The HDD 704 is, for example, a hard disk drive device, and stores a computer program and other data files, as a nonvolatile recording device.

The network IF 706 is an interface for communication by wire or radio, and achieves communication with a client terminal 3 via the internet.

The display device 708 is, for example, a liquid crystal display.

The input device 710 is, for example, a keyboard and mouse.

Figure 5:
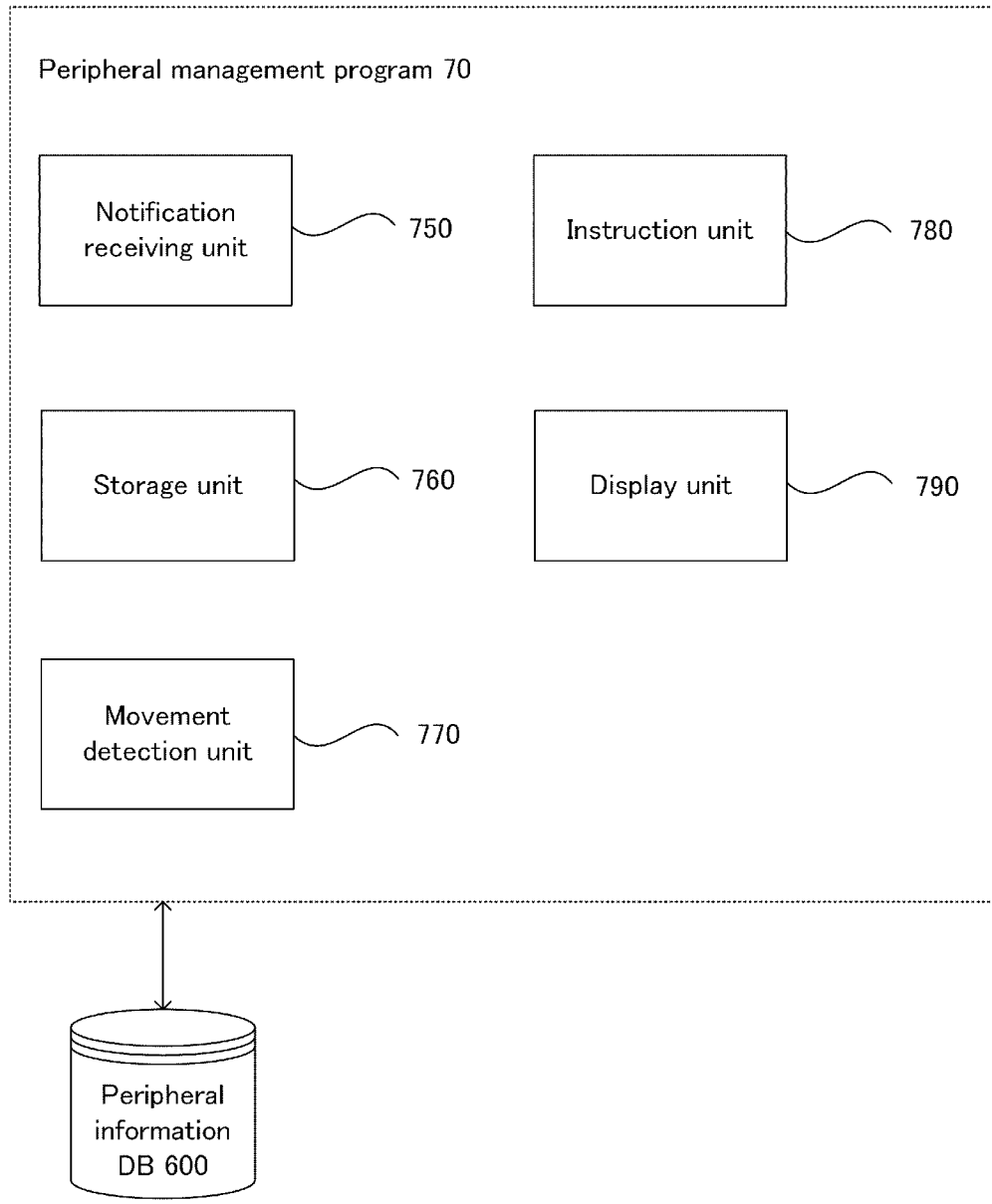
FIG. 5 is a diagram of an example of the functional configuration of the management server 7.

FIG. 5 is a diagram of an example of the functional configuration of the management server 7.

As shown in FIG. 5, a peripheral management program 70 is installed in the management server 7, and peripheral-information databases 600 (peripheral information DB 600) are composed. These databases are examples of a storage means according to the present invention.

The peripheral management program 70 has a notification receiving unit 750, storage unit 760, movement detection unit 770, instruction unit 780, and display unit 790.

Part or all of the peripheral management program 70 may be achieved by hardware such as an ASIC or may be achieved by borrowing part of the function of an OS.

In the peripheral management program 70, the notification receiving unit 750 receives periodic notification by periodic communication from a client terminal 3.

The notification receiving unit 750 according to the present embodiment receives, as an operating state of a peripheral, heartbeat-notification transmitted by a client terminal 3.

The storage unit 760 stores an operating state of a peripheral 5, notified by a client terminal 3. For example, the storage unit 760 stores an operating state of a peripheral 5 to be managed, into the peripheral information DB 600 such that the operating state is correlated with the identification information of the peripheral 5 and with the identification information of a client terminal 3 informed of the operating state of this peripheral 5.

Additionally, on the basis of information received by the notification receiving unit 750, the storage unit 760 stores the presence or absence of a peripheral 5 and the operating state of the peripheral 5 such that they are correlated with the identification information of a corresponding client terminal 3.

The storage unit 760 according to the embodiment stores a client terminal ID, terminal name, connected peripheral ID, management state, and so on, received by the notification receiving unit 750, in a terminal management table 900 on the peripheral information DB 600 shown in FIG. 12 as an example. Additionally, the storage unit 760 stores, a connected peripheral ID, the type, model name, and serial number (No.) of the peripheral, its operating state, and so on, received by the notification receiving unit 750, in a peripheral information management table 910 on the peripheral information DB 600, shown in FIG. 12 as an example.

The movement detection unit 770 detects change in a client terminal 3 to which a peripheral 5 is connected.

For example, on the basis of identification information of a client terminal 3 and identification information of a peripheral 5, which are stored in the storage unit 760, the movement detection unit 770 detects movement of the peripheral 5.

When the movement detection unit 770 according to the present embodiment newly receives heartbeat-notification from client terminals 3 due to detection of the power-on of a peripheral 5, the unit 770 determines from information stored in the peripheral information DB 600 the presence or absence of client terminals 3 to which the peripheral 5 identical to the former peripheral 5 may have been connected. If the client terminal 3 to which the identical peripheral 5 has been connected is detected as a result of the determination, it is determined that, "the peripheral 5 has moved" from "the detected client terminal 3" to "the client terminal 3 that has heartbeat-notified due to power-on detection." Then, the management state of the client terminal 3 to which the identical peripheral 5 had been connected (i.e., the terminals other than the terminal that has heartbeat-notified due to detection of the power-on), is updated to "not to be managed."

Thus, the management server 7 is able to determine a state in which a peripheral 5 is not connected to a client terminal 3, and a state in which the peripheral 5 is connected to a client terminal 3 but the power is off.

On condition that a peripheral 5 to be managed operates on any of client terminals 3, the instruction unit 780 gives an instruction of periodic notification to the client terminals 3.

For example, if a change in any of peripherals 5 is detected by the movement detection unit 770, the instruction unit 780 instructs any changed client terminal 3 to change communication interval.

Additionally, in accordance with the presence or absence of a peripheral 5 stored by the storage unit 760 or an operating state thereof, the instruction unit 780 gives the client terminal 3 an instruction of a communication interval corresponding to a period notification.

For example, when a peripheral 5 to be managed is not connected to a client terminal 3, the instruction unit 780 instructs the client terminals 3 to use a communication interval longer than that when a peripheral 5 to be managed is connected to a client terminal 3.

When a client terminal 3 is updated by the movement detection unit 770 as a terminal not to be managed, the instruction unit 780 according to the present embodiment instructs, through reply information about heartbeat-notification in periodic notification, the client terminal 3 to stop heartbeat-notification in periodic notification.

The display unit 790 excludes identification information of a client terminal 3 to which a peripheral 5 is not connected, and displays identification information of a peripheral 5 in an operating state and identification information of the client terminal 3 correlated with it, and identification information of the peripheral 5 in a stopping state and identification information of the client terminal 3 correlated with it.

The display unit 790 according to the present embodiment excludes identification information of a client terminal 3 to which a peripheral 5 is not connected, from data stored in the peripheral information DB 600 by the storage unit 760, and displays a terminal name, the type, model name, serial number (No.), and operating state of a connected peripheral.

Accordingly, only client terminals 3 to which peripherals 5 are connected are displayed in a list as client terminals to be managed, whereas client terminals 3 to which peripherals 5 are not connected are not displayed. Thus, it is made easier to refer to information about terminals to which peripherals 5 are connected and about the terminals 5.

Figure 6:
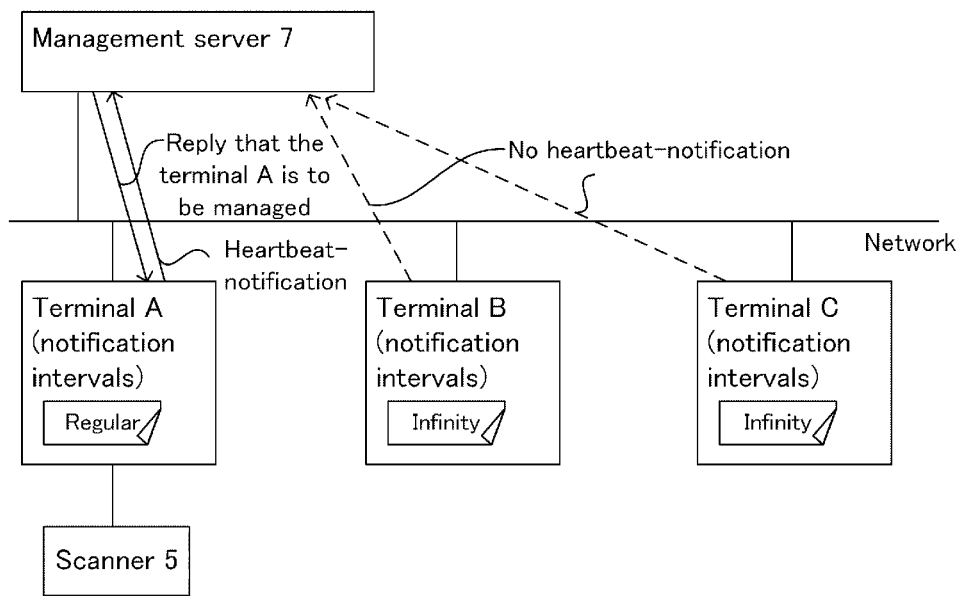
FIG. 6 is a schematic diagram of the peripheral management system 1 in a steady state.

FIG. 6 is a schematic diagram of the peripheral management system 1 in a steady state. Here, steady state refers to a state in which there is no movement of peripherals 5 and client terminals 3 heartbeat-notify the management server 7 in periodic notification.

As shown in FIG. 6 as an example, in the present embodiment, a management server 7, terminals A, B, and C, and a scanner 5 connected to the terminal A are present in the peripheral management system 1. Here, the terminals A, B, and C are client terminals 3. (They are the same for FIGS. 7, 8, and 9.) The terminal A heartbeat-notifies the management server 7 in periodic notification. Since no peripherals 5 are connected to the terminals B, C and these terminals are not to be managed, their notification intervals for heartbeat-notification have been set to infinity. That is to say, the terminals B, C do not carry out heartbeat-notification in periodic notification.

Incidentally, in the initial state of the peripheral management system 1, the terminals A, B, and C heartbeat-notify the management server 7 of their initial states. The management server 7 refers to the terminal management table 900 and, if it is determined that the terminal A to which a scanner 5 is connected is to be managed, the management server 7 replies, as a response to heartbeat-notification in the initial state, to the terminal A that the terminal A is to be managed. Through reply information, the management server 7 instructs the terminal A to carry out heartbeat-notification in periodic notification. According to the instruction from the management server 7, the terminal A carries out heartbeat-notification in periodic notification. The management server 7 refers to the terminal management table 900 and, if it is determined that the terminals B, C to which peripherals 5 are not connected are not to be managed, the management server 7 replies, as a response to heartbeat-notification in the initial state, to the terminals B, C that the terminals B and C are not to be managed. Through reply information the management server 7 instructs the terminals B, C to set heartbeat-notification in periodic notification to infinity. According to the instruction from the management server 7, the terminals B, C stop heartbeat-notification in periodic notification.

Figure 7:
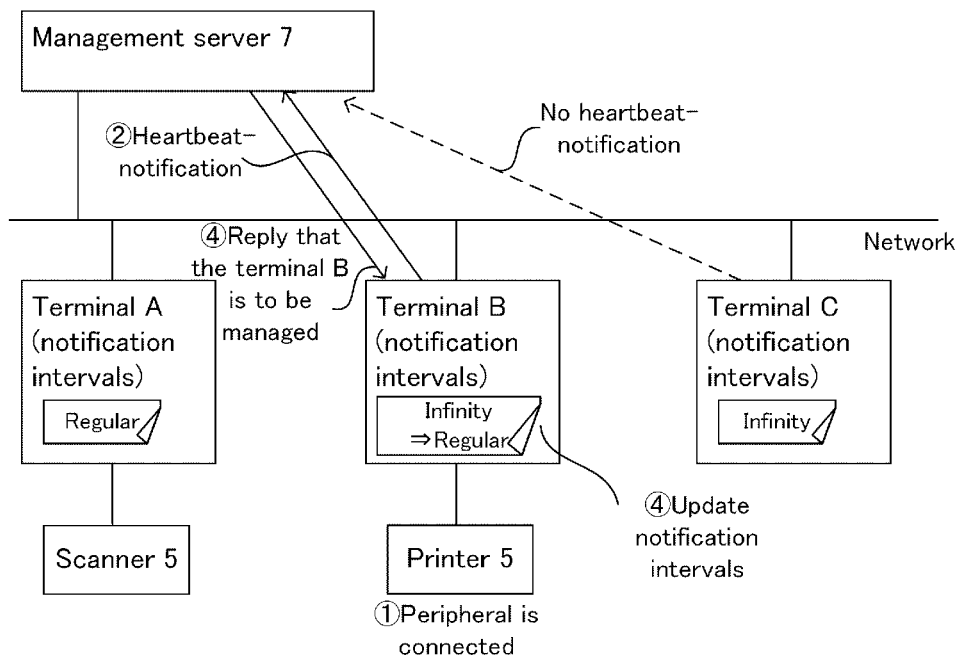
FIG. 7 is a schematic diagram of the peripheral management system 1 showing connections with peripherals.

FIG. 7 is a schematic diagram of the peripheral management system 1 showing connections with peripherals.

As shown in FIG. 7 as an example, in the present embodiment, the management server 7, the terminals A, B, and C, the scanner 5 connected to the terminal A, and a printer 5 newly connected to the terminal B are present in the peripheral management system 1. When the printer 5 is newly connected to the terminal B and the power of the printer 5 is turned on, the terminal B heartbeat-notifies the management server 7 of a power on-state of the printer 5 due to power-on detection. The management server 7 registers the peripheral ID "H002" of the connected printer 5 in the terminal management table 900 such that this ID is correlated with the terminal B and such that "management state" of the terminal B is changed from "not to be managed" to "to be managed." As a response to the heartbeat-notification due to power-on detection, the management server 7 replies to the terminal B that the terminal B is to be managed, and, through reply information, instructs the terminal B to change the heartbeat-notification interval in periodic notification to "regular" from "infinity." On the basis of replied information, the terminal B changes the heartbeat-notification interval to "regular" from "infinity" and carries out heartbeat-notification in periodic notification.

Figure 8:
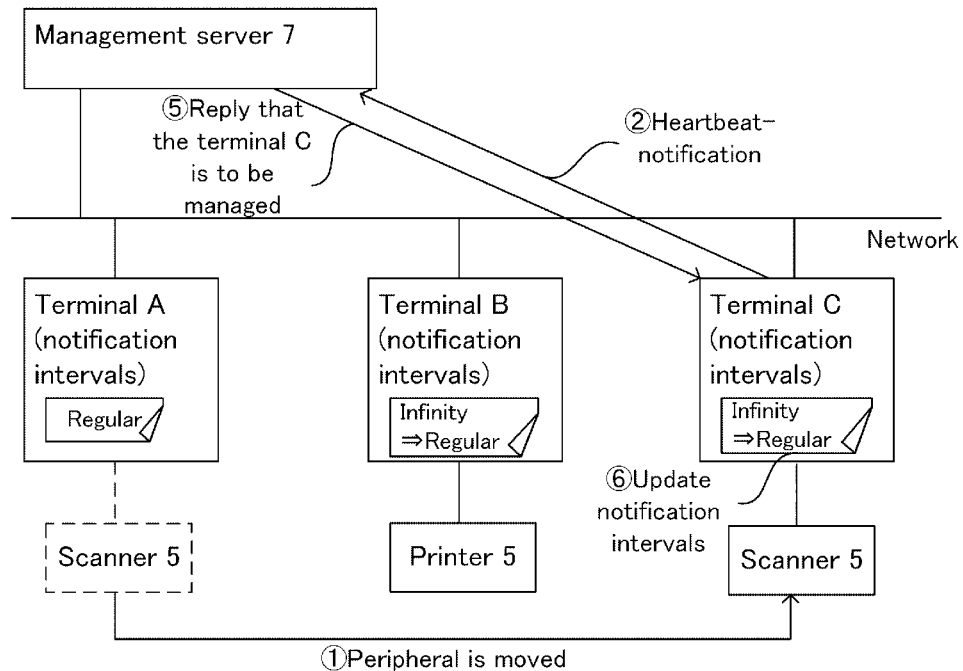
FIG. 8 is a schematic diagram of the peripheral management system 1 during movement of peripherals.

FIG. 8 is a schematic diagram of the peripheral management system 1 during movement of peripherals.

As shown in FIG. 8 as an example, in the present embodiment, the management server 7, the terminals A, B, and C, the printer 5 connected to the terminal B, and the scanner 5 moved from the terminal A to the client terminal C are present in the peripheral management system 1.

In the present embodiment, when the scanner 5 connected to the terminal A is moved and connected to the terminal C, and the power of the scanner 5 is turned on, the terminal C heartbeat-notifies the management server 7 of a power on-state of the scanner 5 due to power-on detection. The management server 7 registers the peripheral ID "H001" of the connected printer 5 in the terminal management table 900 such that this ID is correlated with the terminal C and such that "management state" of the terminal C is changed from "not to be managed" to "to be managed."

Additionally, when the management server 7 is heartbeat-notified by the terminal C due to detection of the power-on of the scanner 5, the server 7 determines the presence or absence of terminals to which the identical peripheral 5 may have been connected, from the terminal management table 900 on the peripheral information DB 600. As a result of the determination, the management server 7 detects the terminal A to which the identical scanner 5 has been connected, and determines that "the scanner 5 has been moved" "from the detected terminal A" to "the terminal C that has heartbeat-notified the server 7 of the operating state." Then, the management server 7 updates the management state of the terminal A, to which the identical scanner 5 had been connected (i.e., the terminals other than the terminal C that has heartbeat-notified), to "not to be managed."

As a response to the heartbeat-notification due to power-on detection, the management server 7 replies to the terminal C that the terminal C is to be managed, and, through reply information, instructs the terminal C to change the heartbeat-notification interval in periodic notification to "regular" from "infinity." On the basis of the replied information, the terminal C carries out heartbeat-notification in periodic notification.

Figure 9:
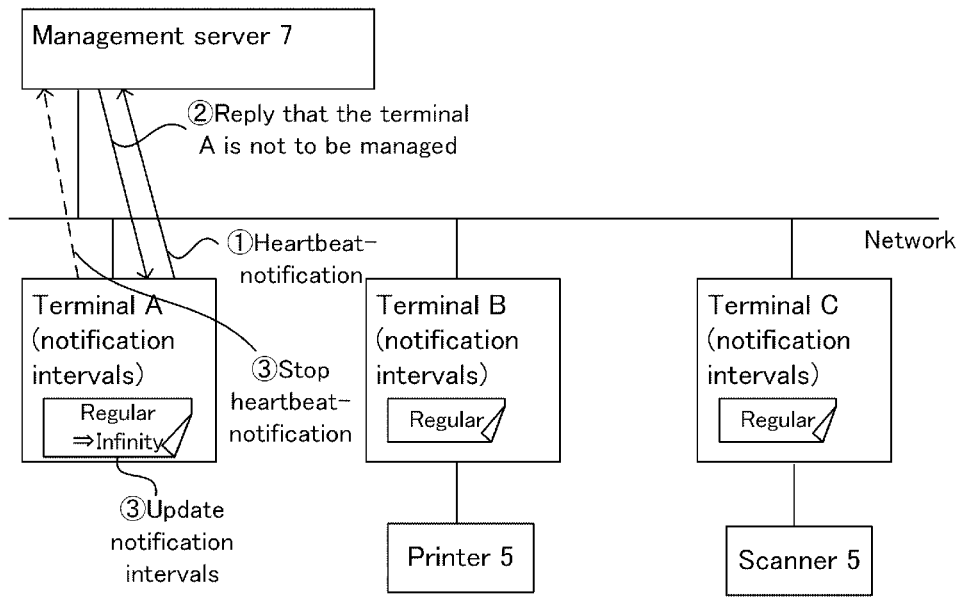
FIG. 9 is a schematic diagram of the peripheral management system 1 after movement of the peripherals.

FIG. 9 is a schematic diagram of the peripheral management system 1 after movement of the peripherals.

An embodiment in FIG. 9 shows, as an example, a communication process after movement of the peripherals shown in FIG. 8. In the embodiment shown in FIG. 9, the management server 7, the terminals A, B, and C, the printer 5 connected to the terminal B, and the scanner 5 connected to the terminal C are present in the peripheral management system 1.

In the present embodiment, after movement of the scanner 5, the terminal A heartbeat-notifies the management server 7 in periodic notification. The management server 7 refers to the terminal management table 900 and, as a response to the heartbeat-notification in periodic notification, replies to the terminal A that the terminal A is not to be managed. Through replay information, the management server 7 instructs the terminal A to change the heartbeat-notification interval in periodic notification from "regular" to "infinity." On the basis of the information replied, the terminal A stops heartbeat-notification in periodic notification.

FIG. 10 is a diagram of an example of a display screen of a management server 7 in conventional technique.

As shown in FIG. 10, in conventional technique, the management server 7 displays, in a list, the terminal names of client terminals 3, the types, model names, serial Nos., and operating states of connected peripherals. The management server 7 also displays the identification information of a client terminal 3 to which a peripheral 5 is not connected. Therefore, the display uses one to ten pages.

FIG. 11 is a diagram of an example of a display screen of the management server 7 in the present invention.

As shown in FIG. 11, in the present invention, the management server 7 displays, in a list, the terminal names of client terminals 3, the types, model names, serial Nos., and operating states of connected peripherals. The management server 7 does not display identification information of a client terminal 3 to which a peripheral 5 is not connected. Therefore, the display uses only one page. Thus, information browsability significantly improves, compared to that in conventional technique.

FIG. 12 shows examples of the terminal management table 900 and the peripheral management table 910.

As shown in FIG. 12, in the present invention, the management server 7 stores, in the terminal management table 900, a client terminal ID, terminal name, connected peripheral ID, management state, and so on.

Additionally, the management server 7 stores, in the peripheral information management table 910, a connected peripheral ID, the type, model name, and serial number No. of the peripheral, its operating state, and so on.

Figure 13:
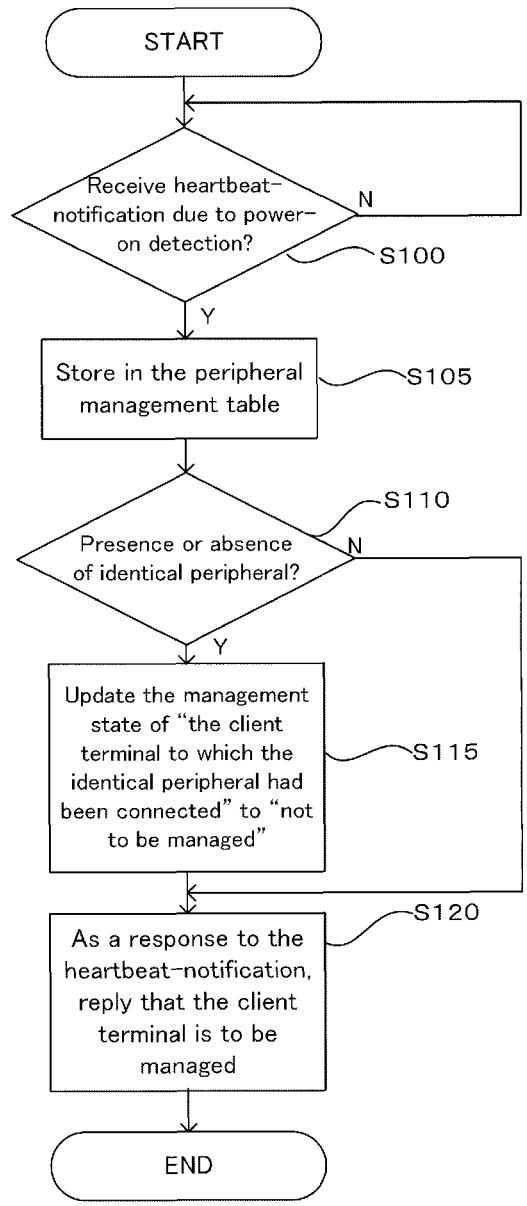
FIG. 13 is a flowchart for peripheral movement processing (S10)

FIG. 13 is a flowchart for peripheral movement processing (S10).

As shown in FIG. 13, in step 100 (S100), the notification receiving unit 750 for the peripheral management program 70 stands by until this unit receives heartbeat-notification from a client terminal 3 due to power-on detection (S100: No) and, upon receiving it, proceeds to a process in S105 (S100: Yes).

In step 105 (S105), the storage unit 760 stores in the peripheral management table 910 the operating state of a peripheral 5 received by the notification receiving unit 750. Also, in the terminal management table 900, the storage unit 760 updates the management state of a client terminal 3 that has newly carried out heartbeat-notification due to power-on detection, to "to be managed" in the operating state.

In step 110 (S110), the movement detection unit 770 determines the presence or absence of client terminals 3 to which a peripheral 5 identical to the peripheral 5 connected to client terminals 3 that has heartbeat-notified due to power-on-detection may have been connected, from the terminal management table 900 on the peripheral information DB 600 stored by the storage part 760. As a result of the determination, if a client terminal 3 to which the peripheral 5 identical to the peripheral 5 connected to a client terminal 3 that has heartbeat-notified is present, the flow proceeds to a process in S115 (S110: Yes). If a client terminal 3 to which the peripheral 5 identical to the peripheral 5 connected to the client terminal 3 that has heartbeat-notified is not present, the flow proceeds to a process in S120 (S110: No).

In step 115 (S115), the movement detection unit 770 determines that "the peripheral 5 has been moved" from "the determined client terminal 3 to which the identical peripheral had been connected" to "the client terminal 3 that has newly heartbeat-notified due to power-on detection." Then, the movement detection unit 770 updates the management state of "the client terminal 3 to which the identical peripheral 5 had been connected" to "not to be managed."

In step 120 (S120), as a response to the heartbeat-notification due to power-on detection, the instruction unit 780 according to the embodiment replies to the client terminal 3 that has heartbeat-notified due to power-on detection, that the client terminal 3 is to be managed. The instruction unit 780 also instructs, through reply information, to return the heartbeat-notification interval in periodic notification to "regular."

Figure 14:
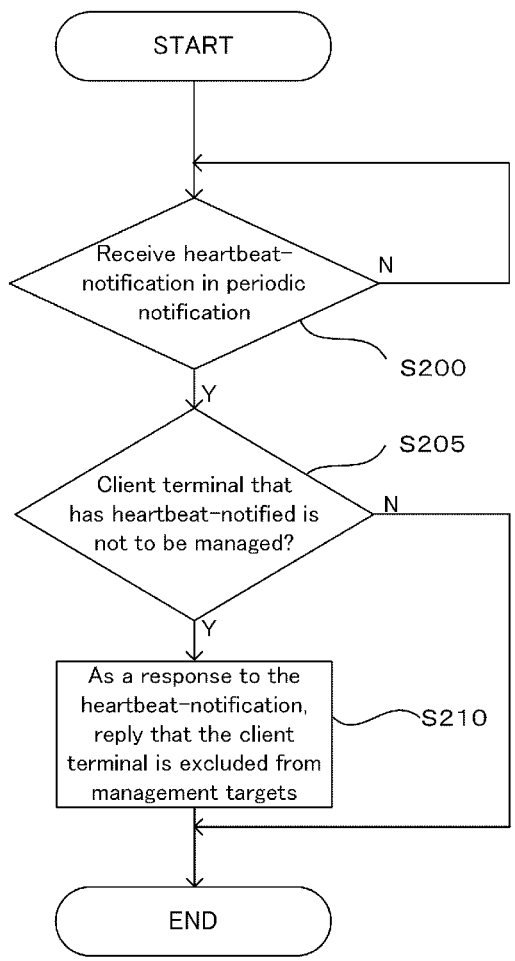
FIG. 14 is a flowchart for a management-target exclusion process (S20)

FIG. 14 is a flowchart for a management-target exclusion process (S20) for excluding a client terminal from management targets.

As shown in FIG. 14, in step 200 (S200), the notification receiving unit 750 for the peripheral management program 70 stands by until this unit receives heartbeat-notification in periodic notification from a client terminal 3 not to be managed (S200: No) and, upon receiving it, proceeds to a process in S205 (S200: Yes).

In step 205 (S205), if the instruction unit 780 determines that a client terminal 3 that has heartbeat-notified is not to be managed, the flow proceeds to a process in S210 (S205: Yes). If it determines that the client terminal 3 that has heartbeat-notified is to be managed, the processing is terminated (S205: No).

In step 210 (S210), the instruction unit 780 replies, to the client terminal 3 determined by the movement detection unit 770 not to be managed, that the client terminal 3 is excluded from management targets. The instruction unit also instructs, through reply information, this client terminal 3 to set a longer heartbeat-notification interval in periodic notification.

Figure 15:
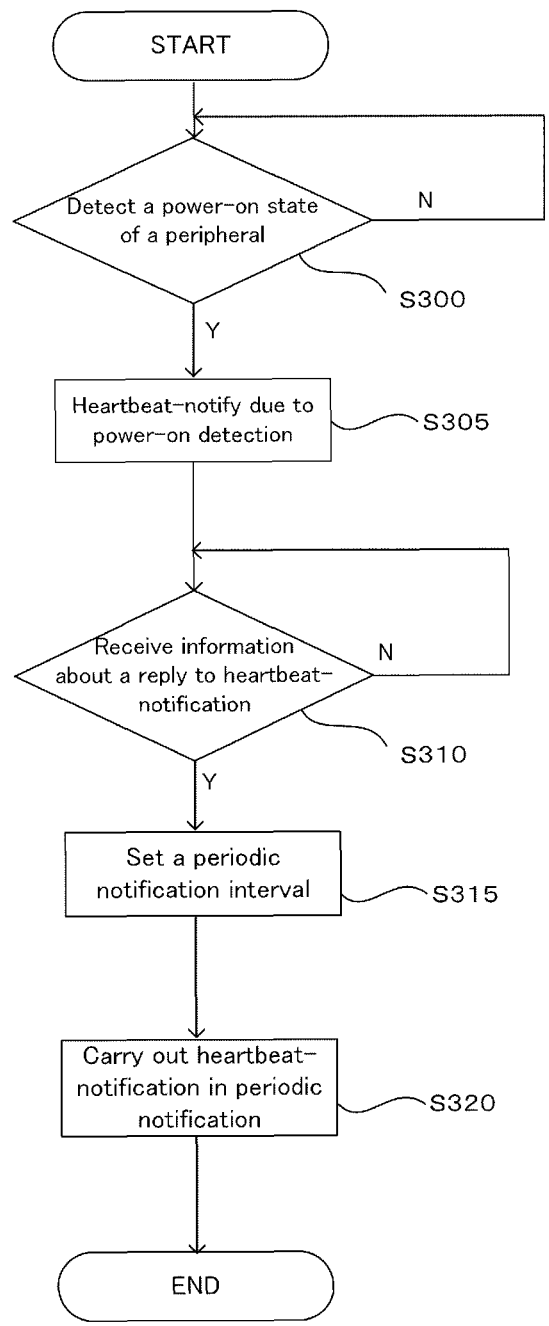
FIG. 15 is a flowchart for a notification interval setting process (S30).

FIG. 15 is a flowchart for a notification interval setting process (S30).

As shown in FIG. 15, in step 300 (S300), the detection unit 350 in the notification interval determination program 30 stands by until this unit newly detects a power-on state of a peripheral 5 (S300: No) and, upon detecting it, proceeds to a process in S305 (S300: Yes).

In step 305 (S305), the notification unit 380 heartbeat-notifies the management server 7 of a power-on state detected by the detection unit 350, due to power-on detection.

In step 310 (S310), the reception unit 390 stands by until this unit receives from the management server 7 information about a reply to heartbeat-notification due to power-on detection (S310: No) and, upon receiving it, proceeds to a process in S315 (S310: Yes).

In step 315 (S315), on the basis of replay information received by the reception unit 390, the interval setting unit 370 sets a periodic notification interval for heartbeat-notification in periodic notification.

In step 320 (S320), the notification unit 380 carries out heartbeat-notification in periodic notification at periodic notification intervals set by the interval setting unit 370.

As described above, the peripheral management system 1 according to the present embodiment is able to inhibit communication with a client terminal 3 to which a peripheral 5 is not connected. Accordingly, this system is able to prevent unnecessary network-communication and hence avoid network overload and overload of access to peripheral information DB 600 on the management server 7.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A peripheral management system including a client terminal which a peripheral can be connected to and a management device which manages the peripheral, wherein:
   the client terminal comprises:
      a detection unit configured to detect an operating state of the connected peripheral;
      a notification unit configured to notify the management device of the operating state detected by the detection unit at a predetermined communication interval; and
      an interval setting unit configured to set the communication interval used for the notification by the notification unit; and
   the management device comprises:
      a storage unit configured to store the operating state of the peripheral notified by the notification unit; and
      an instruction unit configured to instruct periodic notification to the client terminal on condition that a peripheral to be managed operates on any of the client terminals,
   wherein the notification unit of the client terminal communicates with the management device at a longer communication interval than that when the peripheral to be managed is connected to the client terminal, when the peripheral to be managed is not connected to the client terminal,
   the interval setting unit of the client terminal sets the communication interval to a finite-time communication interval in accordance with instruction of the periodic notification from the instruction unit, and
   the notification unit notifies periodically the operating state at the set communication interval.

2. The peripheral management device according to the claim 1, wherein:
   the interval setting unit sets the communication interval to infinity when the peripheral is not connected to the client terminal; and
   the notification unit stops the notification in accordance with the setting by the interval setting unit when the peripheral is not connected.

3. The peripheral management system according to the claim 2, wherein:
   the management device further comprises a movement detection unit configured to detect a change in the client terminal which the peripheral is connected to; and
   the instruction unit instructs a change in the communication interval to the changed client terminal when the movement detection unit detects the change in any of the peripherals.

4. The peripheral management system according to the claim 3, wherein:
   the storage unit stores the operating state of the peripheral to be managed in condition where it is correlated with identification information of the peripheral and identification information of the client terminal which notifies of the operating state of the peripheral; and
   the movement detection unit detects the movement of the peripheral based on the identification information of the client terminal and the identification information of the peripheral that are stored by the storage unit.

5. The peripheral management system according to the claim 1, wherein
   the management device further comprises a display unit configured to exclude identification information of the client terminal which the peripheral is not connected to and display identification information of the peripheral in the operating state and identification information of the client terminal correlated with it, and identification information of the peripheral in the stopping state and identification information of the client terminal correlated with it.

6. A management device which communicates with a client terminal which a peripheral can be connected to and manages the peripheral, comprising:
   a notification receiving unit configured to receive periodic notification which the client terminal notifies periodically of;
   a storage unit configured to store existence or non-existence of the peripheral and an operating state in condition where they are correlated with identification information of the client terminal based on information received by the notification receiving unit; and
   an instruction unit configured to instruct an instruction of a communication interval corresponding to a periodic notification to the client terminal in response to the existence or non-existence of the peripheral or the operating state stored by the storage unit, wherein
   the instruction unit instructs periodic notification to the client terminal on condition that the peripheral to be managed operates on any of the client terminals, and
   the instruction unit instructs to the client terminal a longer communication interval than that when the peripheral to be managed is connected to the client terminal, when the peripheral to be managed is not connected to the client terminal.

7. A management method of managing a peripheral via a client terminal which the peripheral can be connected to, comprising:

an instruction step of a management device instructing periodic notification to the client terminal on condition that the peripheral to be managed operates on any of the client terminals;

a detection step of the client terminal detecting an operating state of the connected peripheral;

a notification step of the client terminal notifying a management device of the operating state detected in the detection step at a predetermined communication interval; and a storage step of the management device storing the operating state of the peripheral notified by the client terminal, wherein in the notification step, the client terminal communicates with the management device at a longer communication interval than that when the peripheral to be managed is connected to the client terminal, when the peripheral to be managed is not connected to the client terminal.

* * * * *